United States Patent
Kagohashi et al.

(10) Patent No.: US 7,261,761 B2
(45) Date of Patent: Aug. 28, 2007

(54) METALLIC NICKEL POWDER AND PROCESS FOR PRODUCTION THEREOF

(75) Inventors: Wataru Kagohashi, Chigasaki (JP); Mitsugu Yoshida, Chigasaki (JP)

(73) Assignee: Toho Titanium Co., Ltd., Chigasaki-shi (JP)

( * ) Notice: Subject to any disclaimer, the term of this patent is extended or adjusted under 35 U.S.C. 154(b) by 0 days.

(21) Appl. No.: 10/525,963

(22) PCT Filed: Jul. 18, 2003

(86) PCT No.: PCT/JP03/09162

§ 371 (c)(1),
(2), (4) Date: Feb. 28, 2005

(87) PCT Pub. No.: WO2004/020128

PCT Pub. Date: Mar. 11, 2004

(65) Prior Publication Data

US 2005/0268992 A1    Dec. 8, 2005

(30) Foreign Application Priority Data

Aug. 28, 2002  (JP) ............................. 2002-248980

(51) Int. Cl.
 *B22F 1/02* (2006.01)
(52) U.S. Cl. .................................. 75/343; 148/513
(58) Field of Classification Search .............. 75/255, 75/343; 252/513; 148/513
See application file for complete search history.

(56) References Cited

U.S. PATENT DOCUMENTS

| | | | |
|---|---|---|---|
| 3,520,676 A * | 7/1970 | Stahr | 148/283 |
| 5,175,024 A * | 12/1992 | Mack | 427/216 |
| 6,168,752 B1 | 1/2001 | Kagohashi et al. | |
| 6,391,084 B1 * | 5/2002 | Ito et al. | 75/255 |
| 6,863,708 B2 * | 3/2005 | Kagohashi et al. | 75/364 |

FOREIGN PATENT DOCUMENTS

| | | |
|---|---|---|
| CA | 2 417 440 | 1/2003 |
| EP | 1 025 936 | 8/2000 |
| JP | 08-246001 | 9/1996 |
| JP | 2000-345219 | 12/2000 |
| JP | 2001-107103 | 4/2001 |
| JP | 2001-247901 | 9/2001 |
| JP | 1344190 A | 4/2002 |
| JP | 2002-180111 | 6/2002 |
| WO | 01/60551 | 8/2001 |

* cited by examiner

*Primary Examiner*—Roy King
*Assistant Examiner*—Ngoclan T. Mai
(74) *Attorney, Agent, or Firm*—Antonelli, Terry, Stout & Kraus, LLP.

(57) ABSTRACT

A metallic nickel powder exhibits superior oxidation behavior and sintering behavior in a process for production of a multilayer ceramic capacitor, and as a result, can prevent delamination, a process for production of the metallic powder is provided. The metallic nickel powder is treated with a carbonic acid water solution. The metallic nickel powder has an average particle diameter of not more than 1.0 μm, oxygen content in a range of from 0.3 to 2.0 wt %, and oxide layer having a thickness in a range of from 2 to 10 nm over the entire surface. In the process for production of the metallic nickel powder, the powder is treated with a carbonic acid water solution and is heated in an oxidizing atmosphere.

13 Claims, 3 Drawing Sheets

METALLIC NICKEL POWDER AND PROCESS FOR PRODUCTION THEREOF

TECHNICAL FIELD

The present invention relates to metallic nickel powders which are suitable for electrically conductive pastes, and in particular, relates to a metallic nickel powder having superior sintering properties which can be used for internal electrodes in a multilayer ceramic capacitor, and relates to a process for production thereof.

BACKGROUND ART

Conventionally, noble metallic powders such as those of silver, palladium, platinum, and gold or base metallic powders such as those of nickel, cobalt, iron, molybdenum, and tungsten are used in conductive pastes as electrical materials, and in particular, in internal electrodes of multilayered ceramic capacitors. Generally, a multilayer ceramic capacitor is made by alternately laminating ceramic dielectric layers and metallic layers which are used as internal electrodes, and by forming external electrodes which are connected to the metallic layer of internal electrodes on two outside faces of the ceramic dielectric layers. Materials which contains a high dielectric constant material as a main component such as barium titanate, strontium titanate, and yttrium oxide are used in the dielectric substances. On the other hand, the noble metallic powders or the base metallic powders mentioned above may be used to form the internal electrodes. However, since more inexpensive electrical materials are required recently, multilayer ceramic capacitors in which the latter base metallic powders are used have been greatly developed. In particular, nickel powder has been mainly developed.

A multilayer ceramic capacitor may be made by the following method. First, a dielectric powder such as one of barium titanate is mixed with an organic binder so as to be suspended. Next, the suspension is formed into a sheet by a doctor blade method to form a dielectric green sheet. On the other hand, metallic powder for an internal electrode is mixed with organic compounds such as organic solvent, plasticizer, or organic binder to form a metallic powder paste, and this paste is coated on the green sheet mentioned above by screen printing. After they are dried, laminated, and pressed, the organic component is removed by heat treatment. Furthermore, they are burned at 1000 to 1300° C. or at more than 1300° C., and outer electrodes are baked on both sides of the dielectric ceramic layer to obtain a multilayer ceramic capacitor.

In the process for production of the multilayer ceramic capacitor described above, the heating treatment in which organic components are vaporized and removed after the laminating process and the pressing process is ordinary performed at 250 to 400° C. in air. In this way, since the heating treatment is performed under an oxidizing atmosphere, metallic nickel powder is oxidized, and therefore, volume expansion occurs. At the same time, the metallic nickel powder begins to be sintered, and volume shrinkage occurs.

Due to this, in the process for production of the multilayer ceramic capacitor, volume change occurs due to expansion or shrinkage of the metallic powder by oxidizing, reducing, and sintering reaction beginning at a low temperature of about 300° C. In this case, if the oxidation behavior or sintering behavior of the metallic nickel powder at low temperature is unstable, deformation may easily occur between the dielectric layer and the electrode layer. As a result, breaking of the layer structure, which is called delamination, such as cracking or exfoliation, may occur.

Many techniques have been suggested to overcome the delamination problem. For example, Japanese Unexamined Patent Application Publication No. Hei 08-246001 discloses metallic nickel power having a tap density of more than a certain limit value versus a certain particle diameter. In this publication, by producing a capacitor in which such a metallic nickel powder and a dielectric is contained in a paste thereof, delamination is unlikely to occur.

The above-mentioned conventional technique is efficient for improving sintering behavior to some extent; however, it is not sufficient to prevent delamination, and further improvement is required.

DISCLOSURE OF THE INVENTION

Therefore, objects of the present invention are to provide a metallic nickel powder in which superior oxidation characteristics and sintering characteristics are exhibited in a producing process of a multilayer ceramic capacitor to prevent delamination, which may be used for a conductive paste, and in particular for a multilayer ceramic capacitor, and a process for production thereof.

More practically, an object of the invention is to provide a metallic nickel powder in which volume change and weight change due to oxidation reaction during a heating process at about 300° C. is small, and volume change due to sintering is small, to prevent delamination, and a process for production thereof.

The inventors researched metallic nickel powders, and as a result, it became clear that sintering behavior varies depending on properties of the oxide layer formed at the surface of metallic nickel powder, and that a metallic powder which is produced by a particular method and has a specific oxide layer, has superior sintering properties.

That is, the metallic nickel powder of the present invention is treated with carbonic acid water solution, and the powder has an average diameter of not more than 1.0 μm, an oxygen content in a range of from 0.3 to 2.0 wt %, and an oxide layer having a thickness in a range of 2 to 10 nm all over the surface.

Furthermore, the present invention provides a producing method for the metallic nickel powder in which the powder is treated in a carbonic acid water solution, and then the powder is heated in an oxidizing atmosphere.

In the metallic nickel powder of the present invention, it is desirable that the average particle diameter of the fine particle be not more than 1.0 μm, more desirably in a range of from 0.05 to 1 μm, and more desirably in a range of from 0.1 to 0.5 μm. The specific surface area of the metallic nickel powder by BET is desirably in a range of 1 to 20 m²/g.

Furthermore, the metallic nickel powder desirably has a spherical shape since sintering properties and dispersing properties can be improved.

The metallic nickel powder of the present invention contains oxygen, and the oxygen content is in a range of from 0.3 to 2.0 wt %, and more desirably in a range of from 0.3 to 1.0 wt %.

The metallic nickel powder of the present invention has a uniform crystalline oxide layer containing nickel oxide having a thickness in a range of from 2 to 10 nm all over the surface. A metallic nickel powder is usually covered with an oxide layer having a thickness of several nanometers; however, a conventional oxide layer of the metallic nickel powder contains primarily non-crystalline parts. Compared to this, the oxide layer of the metallic nickel powder of the present invention has substantially uniform thickness all over the surface, and a composition of crystalline nickel oxide (NiO). In practice, it is desirable that the oxide layer contain nickel oxide have a crystal structure of a cubic crystal (face-centered cubic). Since the powder contains the uniform oxide layer, oxidation behavior and sintering behavior during heating treatment in an oxidizing atmosphere are stable.

The metallic nickel powder of the present invention can be produced by a known method such as a gas phase method or a liquid phase method. In particular, a gas phase reduction method in which nickel chloride gas and reducing gas are contacted to produce nickel powder, or an atomization heat decomposition method in which nickel compound which is easily decomposed with heat is atomized and thermally decomposed is desirable since the particle diameter of nickel powder generated can be easily controlled and since spherical particles can be efficiently produced.

Usually in the gas phase reduction method, vaporized nickel chloride gas and a reducing gas such as hydrogen are reacted, and nickel chloride gas can be generated by heating and vaporizing solid nickel chloride. However, from the viewpoints of suppression of oxidation or moisture absorbency of nickel chloride and energy efficiency, it is advantageous that nickel chloride gas be continuously generated by contacting metallic nickel and chlorine gas, and that the nickel chloride gas be directly supplied to a reducing process, and then that the nickel chloride gas be contacted with reducing gas to reduce the nickel chloride gas continuously to produce nickel powder.

In the producing process of nickel powder by the gas phase reduction reaction, nickel atoms are generated at the moment nickel chloride gas and reducing gas are contacted, and the nickel atoms collide and clump to form superfine particles, and the particles grow larger. Depending on conditions such as temperature or partial pressure of nickel chloride gas during the reducing process, the particle diameter of nickel powder generated is determined. In the above-mentioned process for production of nickel powder, since the nickel chloride gas is generated depending on the supplied amount of chlorine gas, the amount of nickel chloride gas supplied to the reducing process can be controlled by controlling the amount of chlorine gas. As a result, the particle diameter of nickel powder which is generated can be controlled. Furthermore, in a different method from a method in which metal chloride gas is generated by heating and vaporizing the solid metal chloride, since metal chloride gas is generated by a reaction of chlorine gas and a metal, the amount of a carrier gas used can be reduced. In some cases under certain production conditions, it is possible to use no carrier gas. Therefore, the gas phase reduction method is more desirable from the viewpoint of production cost since the amount of carrier gas and heating energy can be reduced.

The partial pressure of nickel chloride gas during the reducing process can be controlled by mixing inert gas with the nickel chloride gas generated in the chlorinating process. In this way, the particle diameter of the nickel powder can be controlled by controlling the amount of chlorine gas supplied or by controlling the partial pressure of the nickel chloride gas supplied in the reducing process. Therefore, the particle diameter of the nickel powder can be stable and altered as desired.

Usually, production conditions of the nickel powder in the above-mentioned gas phase reduction method are determined to obtain an average particle diameter of not more than 1 μm. For example, the particle diameter of metallic nickel, which is a starting material, is determined to be in a range of from 5 to 20 mm, and the shape is desirably granular, aggregated, or placoid. The purity is desirably not less than about 99.5%. First, the metallic nickel is reacted with chlorine gas to generate nickel chloride gas. The temperature of this reaction is not less than 800° C. to promote the reaction sufficiently, and not more than 1453° C., which is the melting point of nickel. Considering the reaction rate and durability of a chlorination furnace, a range of from 900 to 1100° C. is desirable in practical use. Next, this nickel chloride gas is directly supplied to a reducing process to contact and react with a reducing gas such as hydrogen. At this time, inert gas such as nitrogen or argon can be mixed with the nickel chloride gas in a range of from 1 to 30 mol % before being supplied to the reducing process. In addition, chlorine gas can be supplied to the reducing process by using only the chlorine gas itself, or together with nickel chloride gas. By supplying chlorine gas to the reducing process, the partial pressure of the nickel chloride gas can be controlled, and as a result, the particle diameter of nickel powder which is produced can be controlled. The temperature of the reducing process is set at not less than a temperature sufficient to complete the reaction; however, the temperature is desirably not more than the melting point of nickel since nickel powder in a solid state is easier to handle. Considering producing cost, the temperature is in a range of from 900 to 1100° C. in practical use.

After the nickel powder is generated by the reducing reaction, the powder is cooled. During the cooling, to prevent forming of a secondary particle formed by aggregating of primary particles of nickel generated and to obtain nickel powder having a desired particle diameter, it is desirable that gas flow after the reducing reaction at about 1000° C. be rapidly cooled to a temperature in a range of from about 400 to 800° C. by blowing inert gas such as nitrogen. After that, the nickel powder is separated and recovered by a bag filter or the like.

In the process for production of nickel powder by the atomization heat decomposition method, a nickel compound which is easily decomposed by heat is used. Practically, one or more kinds selected from nitrate, sulfate, oxynitrate, oxysulfate, chloride, ammonium complex, phosphate, carboxylic acid salt, and alkoxy compound of nickel, can be mentioned. A solution containing the nickel compound is atomized to form fine liquid drops. As a solvent used therein, water, alcohol, acetone, ether, or the like can be mentioned. To atomize the solution, ultrasonic waves or a double jet nozzle can be used. The fine liquid drops generated therein are heated to decompose the nickel compound, and a nickel powder is generated. The heating temperature at this time is not less than a temperature to decompose the specific nickel compound used, and is desirably near the melting point of nickel.

In the production process of metallic nickel powder by the liquid phase method, nickel hydroxide is generated by adding nickel water solution containing, for example, nickel sulfate, nickel chloride, or nickel complex to alkali metal hydroxide such as sodium hydroxide. Next, the nickel hydroxide is reduced by a reducing agent such as hydrazine to obtain metallic nickel powder. The metallic nickel powder generated can be abraded if necessary to obtain uniform particles.

In the present invention, the metallic nickel powder obtained as described above is suspended in a carbonic acid water solution.

During the suspending treatment in the carbonic acid water solution, ordinarily, the metallic nickel powder obtained by the above-mentioned method is dried and is suspended in a carbonic acid water solution. In this case, in the production process for metallic nickel powder by the gas phase reducing method and the atomization heat decomposition method, the nickel powder which is produced is ordinarily washed with pure water; alternatively, it is washed with a carbonic acid water solution, is washed by introducing carbonic acid gas in a water slurry after washing with pure water, or is washed by adding carbonic acid solution to the water slurry. In particular, in the case in which the gas phase reducing method is applied, it is desirable that the nickel powder in mid-flow or after washing with pure water in a slurry state be contacted with carbonic acid water solution from the viewpoint of simplification of the production process.

Furthermore, in the gas phase reducing method, the chlorine part in the metallic nickel powder can be efficiently removed by washing with carbonic acid water solution. After removing the chlorine part sufficiently, by contacting and treating the metallic nickel powder with carbonic acid water solution again, metallic nickel powder having superior properties such as sintering behavior can be obtained.

In this way, by suspending and treating the metallic nickel powder in a carbonic acid water solution, hydroxide such as nickel hydroxide present at the surface of the nickel powder, and fine particles formed from exfoliation from the surface of the nickel powder occurring by friction of particles, can be removed.

The pH of the treatment in carbonic acid water solution is in a range of from 5.5 to 6.5, desirably in a range of from 5.5 to 6.0. In the case in which the treatment is performed at less than pH 5.5, a non-uniform oxide layer is formed on the surface of the metallic nickel powder, and the sintering properties of the metallic nickel powder are deteriorated. Furthermore, the metallic nickel powder itself is dissolved, and the surface becomes rough. In the case in which the treatment is performed at more than pH 6.5, hydroxide attached or absorbed on the surface of the metallic nickel powder cannot be removed, and the remaining hydroxide becomes a non-uniform oxide layer after a drying process. The sintering behavior thereby becomes unstable.

The temperature of the treatment in the carbonic acid water solution is in a range of from 0 to 100° C., desirably in a range of from 10 to 50° C., more desirably in a range of from 10 to 35° C. As a treatment condition, a method in which carbonic acid gas is blown into a slurry of metallic nickel powder to dissolve the carbonic acid gas in the slurry and at the same time the metallic nickel powder is held therein, or a method in which the nickel powder is suspended in a carbonic acid water solution and the slurry is agitated to treat it, can be mentioned. After the treatments like these, the powder is washed and dried, if necessary.

As the drying method of the metallic nickel powder, a known method can be performed. Practically, gas flow drying in which high-temperature gas is contacted with the powder, heating drying, or vacuum drying can be performed. In particular, the gas flow drying is desirable since abrasion of the oxide layer due to contact of particles does not occur. On the other hand, a method in which metallic nickel powders are contacted with each other, such as stirring, is not desirable since the oxide layer of the surface of the particle is decreased by abrasion and the layer becomes non-uniform. To form a uniform oxide layer, it is desirable that water be removed and that it be dried in a very short time. Practically, the desirable time in which metallic nickel powder in water slurry state or powder having water content of about 50 wt % loses the water therein until not more than 0.1 wt %, is not more than 1 minute, desirably not more than 30 seconds, and more desirably not more than 10 seconds. The gas flow drying method is desirable since the particles can be dried within these time periods. In the gas flow drying, high-temperature nitrogen gas at 200 to 300° C., desirably at about 250° C., is used.

In the present invention, the metallic nickel powder is desirably heated in the air or oxygen gas atmosphere after the above-mentioned treatment by carbonic acid water solution. In particular, it is desirable that the powder be treated in a carbonic acid water solution, be dried by gas flow drying until the water content is not more than 0.1 wt %, and be heated in an oxidizing atmosphere such as in air or oxygen gas.

The temperature of the heating is ordinarily from 200 to 400° C., desirably from 200 to 300° C., and more desirably from 200 to 250° C. In the case in which the heating is performed at less than 200° C., hydroxide remains on the surface of nickel, and it becomes difficult to form an oxide layer sufficient to give the nickel powder superior oxidation behavior and sintering behavior. On the other hand, in the case in which the heating is performed at more than 400° C., not only is the surface oxidized, the inside of the nickel powder is also oxidized. As a result, sintering property is deteriorated and resistance of internal electrodes of a mul tilayer ceramic capacitor is increased. Furthermore, since the metallic nickel powder is sintered and aggregated during the heating treatment, defects in structure such as short circuiting of internal electrodes may occur in the multilayer ceramic capacitor.

The heating treatment time is ordinarily in a range of from 30 minutes to 10 hours, performing the heat treatment so that oxygen content in the metallic nickel powder is in a range of from 0.3 to 2.0 wt %.

By suspending and treating the metallic nickel powder in a carbonic acid water solution in this way, hydroxide, such as nickel hydroxide, present at the surface of the nickel powder, and fine particles formed from exfoliation from the surface of the nickel powder due to friction of particles, can be removed. Next, by drying and heating the metallic nickel powder in an oxidizing atmosphere after the treatment in the carbonic acid water solution, metallic nickel powder having a uniform oxide layer can be obtained. If the treatment by carbonic acid water solution is not performed and the powder is dried in spite of hydroxide remaining on the surface of the particle, the hydroxide forms a non-uniform oxide layer on the surface after drying or fine particles formed from exfoliation by friction of particles remaining on the surface. Furthermore, if this powder is heated to 200 to 400° C., hydroxide on the surface is changed to oxide to form an oxide layer; however, the thickness of the oxide layer is non-uniform, and concavoconvex parts or fine particles are formed on the surface, and the surface is not smooth.

In the case in which the metallic nickel powder of the present invention is used in an internal electrode of a multilayer ceramic capacitor, the powder is heated in an oxidizing atmosphere at about 300° C. to remove organic components. At this time, weight change by oxidation and volume change by sintering are small compared to those in the conventional powders. This means that delamination is unlikely to occur when the multilayer ceramic capacitor is burned. Therefore, the metallic nickel powder of the present invention exhibits superior oxidation behavior and sintering behavior, and delamination is unlikely to occur in the production process of the multilayer ceramic capacitor.

The process for production of the metallic nickel powder of the present invention is an advantageous method to produce the above-mentioned metallic nickel powder, and the process includes a treatment of the metallic nickel powder in a carbonic acid water solution and a heat treatment under an oxidizing atmosphere.

In the process for production of the metallic nickel powder of the present invention, the metallic nickel powder is treated in a carbonic acid water solution and is heated under an oxidizing atmosphere to form an oxide layer on the surface of the metallic nickel powder. As a result, sintering behavior of the metallic nickel powder is improved, sintering start temperature of the metallic nickel powder can be made higher, and furthermore, shrinkage ratio of the metallic powder during sintering can be reduced.

EXPLANATION OF REFERENCE NUMERAL

1 . . . Chlorination furnace, 2 . . . Reduction furnace, M . . . Raw material metallic nickel powder, P . . . Metallic nickel powder.

BEST MODE FOR CARRYING OUT THE INVENTION

The present invention is further explained in detail by way of Examples.

Production of Metallic Nickel Powder

EXAMPLE 1

Figure 1:
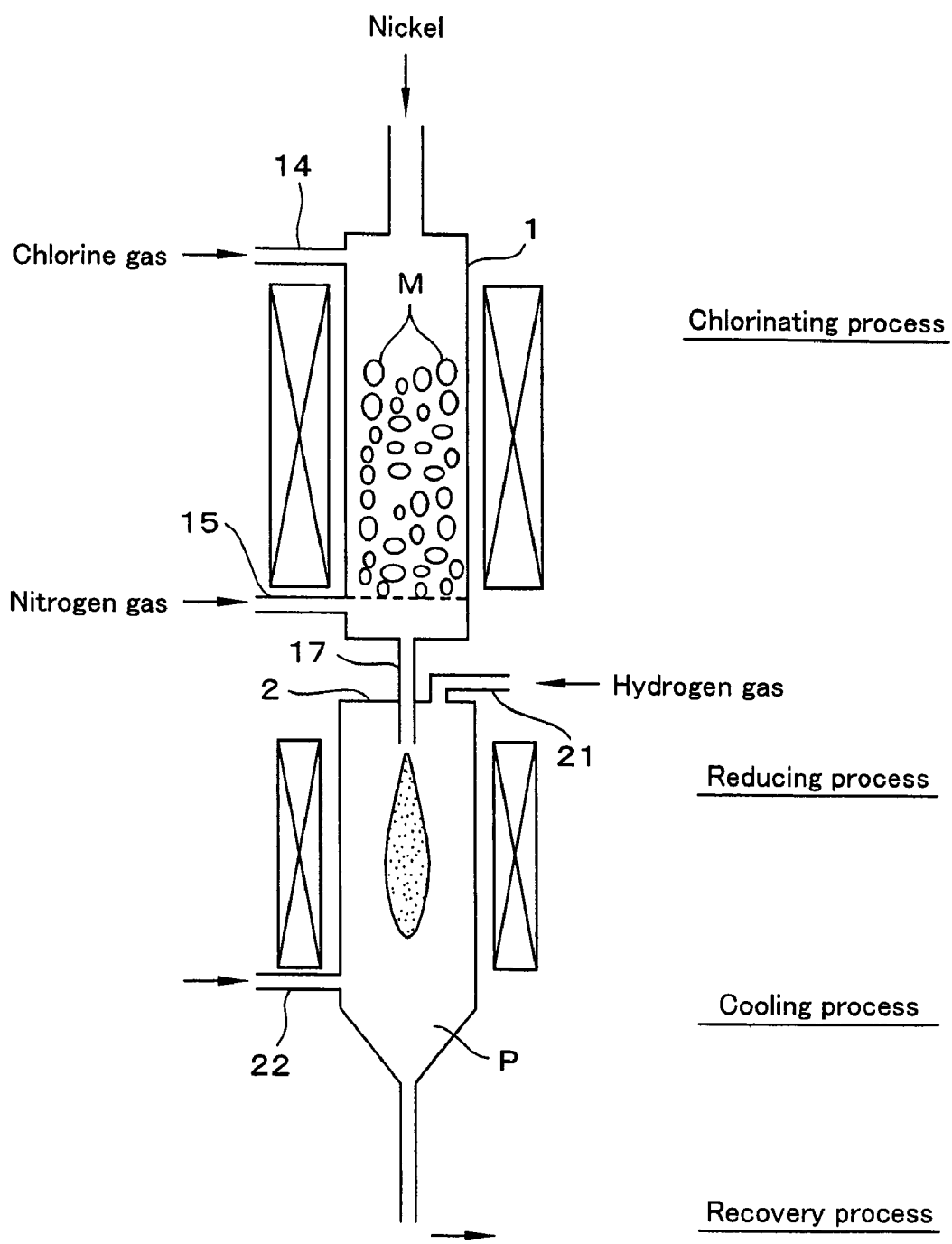
FIG. 1 is a longitudinal cross section showing a structure of the production device of metallic nickel powder used in the Examples of the present invention.

Metallic nickel having an average diameter of 5 mm was filled in a chlorination furnace 1 of a production device for metallic nickel powder shown in FIG. 1, the temperature of the atmosphere in the furnace was held at 1100° C., chlorine gas was induced, and metallic nickel chloride gas was generated by chlorinating the metallic nickel. Nitrogen gas of 10% (mol ratio) of the supplied amount of the chlorine gas was mixed with the nickel chloride gas, this nickel chloride-nitrogen gas mixture was induced into a reducing furnace 2 having an internal atmosphere temperature of 1000° C. through nozzle 17. At the same time, hydrogen gas was supplied through a top part of the reducing furnace 2, to reduce the metallic nickel chloride gas. Gas containing the metallic nickel powder generated at this reducing reaction was cooled by supplying nitrogen gas in a cooling process. Next, the gas mixture (nitrogen gas, hydrochloric acid vapor, and metallic nickel powder) was induced to a washing tank filled with pure water to separate, recover, and wash the metallic nickel powder. Next, carbonic acid gas was blown into the metallic nickel powder slurry to maintain the pH at 5.5 to form a carbonic acid water solution, and the treatment was performed for 60 minutes at room temperature (carbonic acid water solution treatment). The metallic nickel powder treated by carbonic acid water solution was dried and heated for 30 minutes at 220° C. (heating treatment) to obtain the metallic nickel powder.

EXAMPLE 2

The metallic nickel powder was produced in a similar manner as in Example 1 except for not performing the heating treatment.

COMPARATIVE EXAMPLE 1

The metallic nickel powder was produced in a manner similar to that of Example 1, except that the carbonic acid water solution treatment was not performed.

COMPARATIVE EXAMPLE 2

The metallic nickel powder was produced in a manner similar to that of Example 1 except that the heating treatment was performed for 30 minutes at 250° C. in air and the carbonic acid water solution treatment not performed.

Measurements

COMPARATIVE EXAMPLE 3

The metallic nickel powder was produced in a manner similar to that of Example 1 except that the carbonic acid water solution treatment and the heating treatment were not performed.

Figure 2:
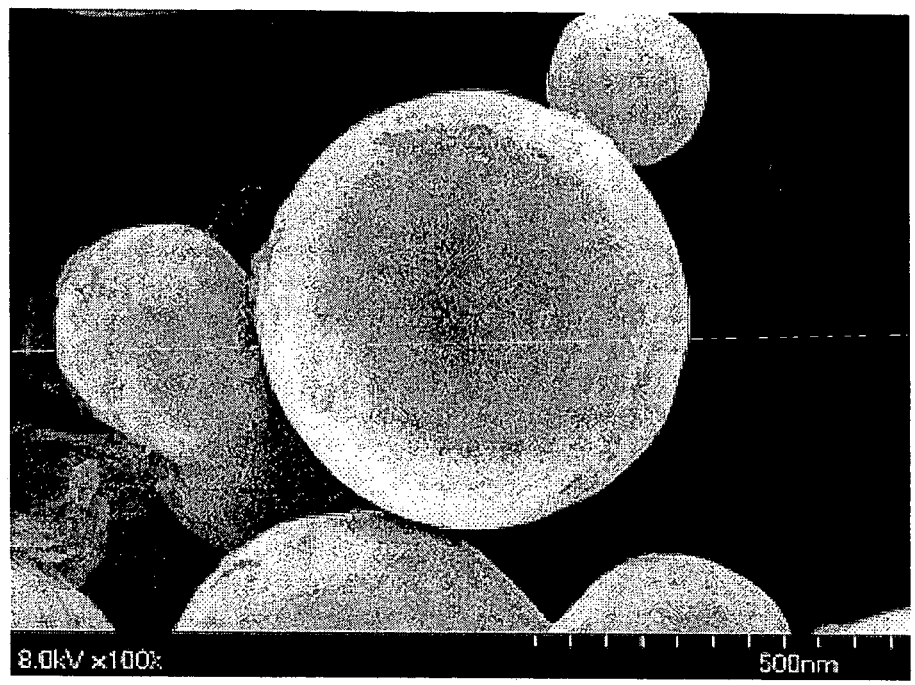
FIG. 2 is a SEM photograph showing metallic nickel powder produced in Example 1.
Figure 3:
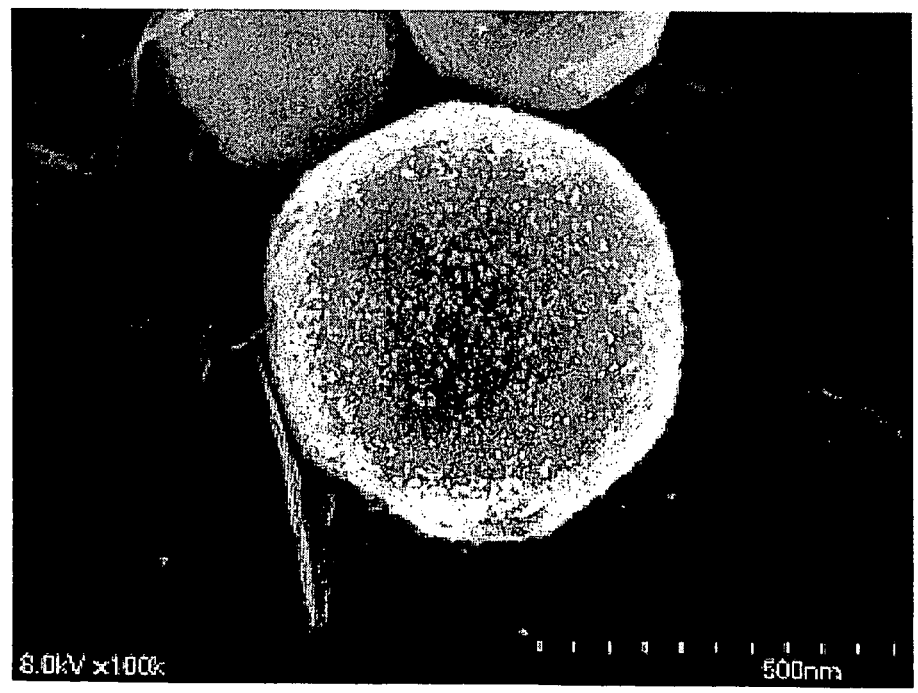
FIG. 3 is a SEM photograph showing metallic nickel powder produced in Comparative Example 3.
Figure 4:
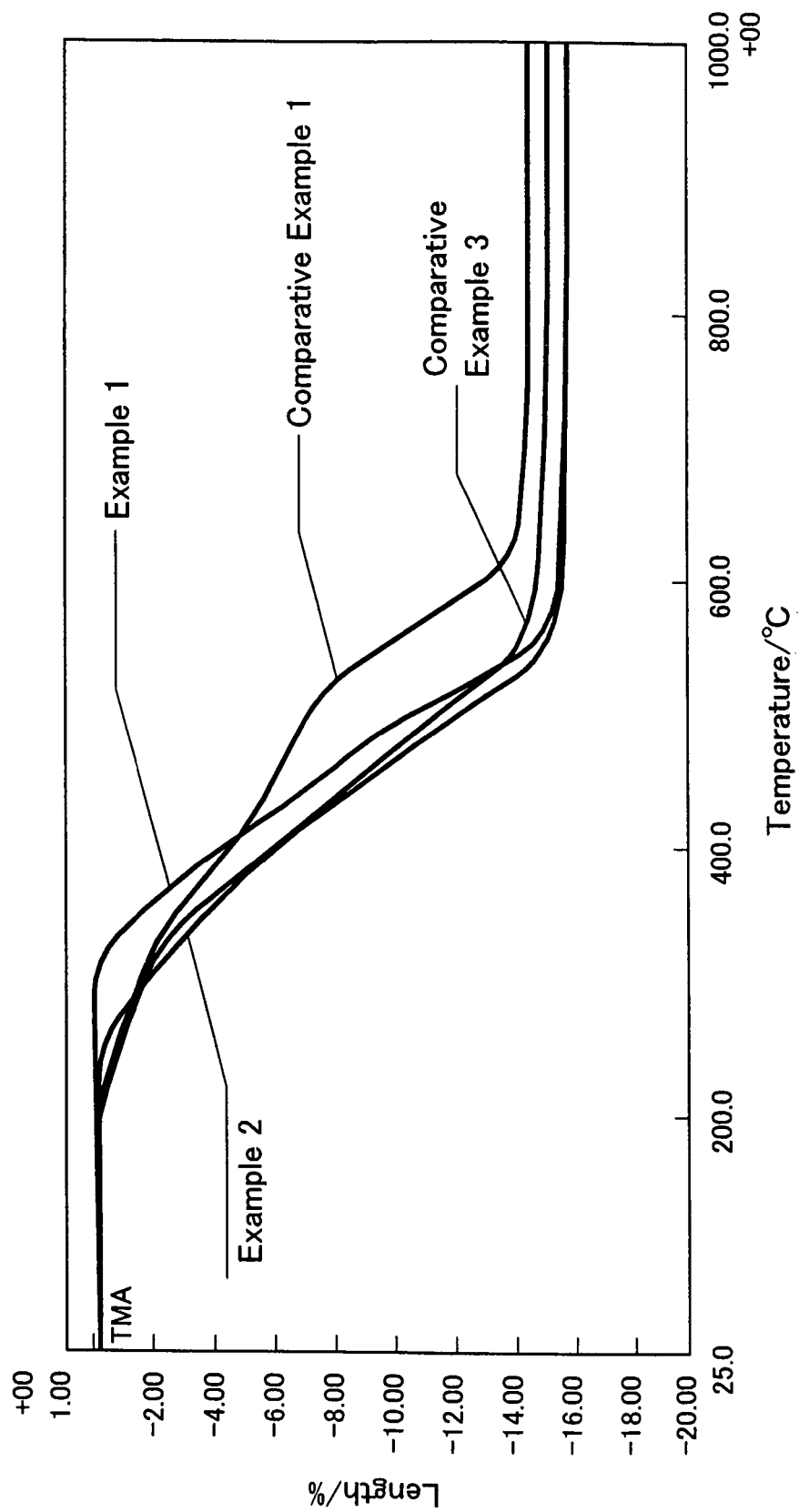
FIG. 4 is a graph showing sintering behavior of Examples 1, 2, and Comparative Examples 1 and 3.

The thickness of the oxide layer, oxygen content, average particle diameter, sintering behavior, oxidation behavior, and particle size distribution of the above-mentioned metallic nickel powder of each Example and Comparative Example were measured by methods explained below. The results are shown in Table 1. SEM photographs of the metallic nickel powder obtained in Example 1 and Comparative Example 3 are shown in FIGS. 2 and 3. Furthermore, a graph showing the sintering behavior of Examples 1 and 2 and Comparative Examples 1 and 2 are shown in FIG. 4.

1) Sintering Behavior 1 g of metallic nickel powder, 3 wt % of camphor and 3 wt % of acetone was mixed and the mixture was filled in a metallic mold having an inner diameter of 5 mm and length of 10 mm, and loading of surface pressure of 1 ton was applied to prepare a test piece. Using a measuring device of thermal expansion shrinkage behavior (diratometry) (trade name: TMA, 8310, produced by Rigaku Corporation), this test piece was measured under conditions of temperature increase rate of 5° C./min in a weakly reducing atmosphere.

2) Average Particle Diameter

A photograph of the sample was taken by an electron microscope, particle diameters of 200 particles were measured, and the average value was calculated.

3) Thickness of Oxide Layer

First, a metallic nickel powder sample was directly sprinkled on a copper sheet mesh having a collodion membrane, and carbon was vaporized to prepare a sample for measurement. Next, a lattice image of the measured sample was observed by using a field-emission transmission electron microscope (tradename: HF-2000, produced by Hitachi, Ltd.) to measure the thickness of the oxide layer all over the surface of the metallic nickel powder.

4) Oxygen Content

Metallic nickel powder of the sample was filled in a nickel capsule, this capsule was placed in a graphite crucible, and the crucible was heated to 3000° C. in argon atmosphere. The amount of carbon monoxide generated therein was determinated, to calculate the oxygen content in the metallic nickel powder.

5) Oxidation Behavior

The sample was heated at a temperature increase rate of 5° C./min until 1000° C. in air, and the weight increased ratio (%) at 300° C. and a temperature at which weight was increased 1% were measured by a TG-DTA measuring device.

TABLE 1

| Characteristics | | Example 1 | Example 2 | Comparative Example 1 | Comparative Example 2 | Comparative Example 3 |
|---|---|---|---|---|---|---|
| Thickness of oxide layer (nm) | | 5 | 3 | 1 to 2 | 1 to 3 | 1 to 2 |
| Oxygen content (wt %) | | 0.54 | 0.39 | 0.26 | 0.63 | 0.50 |
| Average particle diameter (μm) | | 0.49 | 0.48 | 0.49 | 0.49 | 0.48 |
| Oxidation behavior | Weight increased ratio at 300° C. (%) | 0 | 0.14 | 0.26 | 0.50 | 1.10 |
| | Temperature at which weight increased by 1% (° C.) | 386 | 378 | 374 | 343 | 278 |

Table 1 clearly shows in the metallic powder of the Examples, that the weight increase ratio is smaller than those of the Comparative Examples, that and the temperature at which the weight increase rate is 1% is higher than those of Comparative Examples. According to these facts, it is clear that oxidation of the metallic nickel powder of Examples is reduced compared to the Comparative Examples. In particular, in Example 1, since a uniform oxide layer was formed by heating treatment, further oxidation by heating is assumed to be reduced.

The surface of the metallic nickel powder of Example 1 shown in FIG. 2 is smooth; however, the surface of the metallic nickel powder of Comparative Example 3 shown in FIG. 3 is rough, and fine particles are attached to the surface.

In the graph of sintering behavior shown in FIG. 4, there is no volume change in the metallic nickel powder of Example 1 in a low temperature range of 200 to 300° C., and the sintering behavior is stable. From these results, the metallic nickel powder of the present invention exhibits superior oxidation behavior and sintering behavior during the production process for a multilayer ceramic capacitor, and as a result, delamination can be efficiently prevented.

As is explained above, the metallic nickel powder of the present invention exhibits more stable oxidation behavior and sintering behavior during the heating treatment at about 300° C. in an oxidizing atmosphere compared to conventional metallic nickel powder, there is no shrinkage and expansion of metallic nickel powder in a low temperature range, and delamination during the production process of a multilayer ceramic capacitor can be prevented.

The invention claimed is:

1. A process for treating metallic nickel powder, the process comprising:
   treating the powder in a carbonic acid water solution; and
   heating the powder in an oxidizing atmosphere.

2. The process for treating metallic nickel powder according to claim 1, wherein the metallic nickel powder obtained by a contact reaction of nickel chloride gas and a reducing gas is treated in a carbonic acid water solution and is heated in an oxidizing atmosphere.

3. The process for treating metallic nickel powder according to claim 1, wherein the treatment in a carbonic acid water solution is performed at a pH in a range of pH 5.5 to 6.5.

4. The process for treating metallic nickel powder according to claim 1, wherein the treatment in a carbonic acid water solution is performed at a temperature in a range of 0 to 100° C.

5. The process for treating metallic nickel powder according to claim 1, wherein the heat treatment in an oxidizing atmosphere is performed at a temperature in a range of 200 to 400° C.

6. The process for treating metallic nickel powder according to claim 1, wherein the metallic nickel powder is treated in a carbonic acid water solution, is dried, and is heated in an oxidizing atmosphere.

7. The process for treating metallic nickel powder according to claim 1, wherein the nickel powder is washed with pure water, and the treating of the powder in the carbonic acid water solution is performed by blowing carbonic acid gas into a water slurry of the metallic nickel powder after the washing with pure water.

8. The process for treating metallic nickel powder according to claim 1, wherein the average particle diameter of the metallic nickel powder is in a range of from 0.05 to 1 μm.

9. The process for treating metallic nickel powder according to claim 1, wherein the specific surface area by BET of the metallic nickel powder is in a range off from 1 to 20 $m^2/g$.

10. The process for treating metallic nickel powder according to claim 1, wherein the shape of the metallic nickel powder is spherical.

11. The process for treating metallic nickel according to claim 1, wherein the metallic nickel powder is for a conductive paste.

12. The process for treating metallic nickel powder according to claim 1, wherein the metallic nickel powder is for a multilayer ceramic capacitor.

13. The process for treating metallic nickel powder according to claim 1, wherein the powder that is treated in a carbonic acid water solution and is heated in an oxidizing atmosphere is a metallic nickel powder obtained by an atomization thermal decomposition in which nickel compound easily decomposed by heat is atomized and thermally decomposed.

* * * * *